United States Patent [19]

Suzuki et al.

[11] Patent Number: 4,551,735

[45] Date of Patent: Nov. 5, 1985

[54] INK JET RECORDING APPARATUS

[75] Inventors: Tetsuo Suzuki, Yokohama; Shigemitsu Tazaki, Matsudo, both of Japan

[73] Assignee: Canon Kabushiki Kaisha, Tokyo, Japan

[21] Appl. No.: 612,698

[22] Filed: May 21, 1984

[30] Foreign Application Priority Data

| | | | |
|---|---|---|---|
| May 30, 1983 | [JP] | Japan | 58-96492 |
| May 30, 1983 | [JP] | Japan | 58-96493 |
| May 31, 1983 | [JP] | Japan | 58-97278 |

[51] Int. Cl.[4] .......... G01D 15/18

[52] U.S. Cl. .......... 346/140 R

[58] Field of Search .......... 346/140 R, 75

[56] References Cited

U.S. PATENT DOCUMENTS

| | | | |
|---|---|---|---|
| 4,383,263 | 5/1983 | Ozawa | 346/140 R |
| 4,394,669 | 7/1983 | Ozawa | 346/140 R |
| 4,450,454 | 5/1984 | Koto | 346/140 R |

*Primary Examiner*—Joseph W. Hartary

*Attorney, Agent, or Firm*—Fitzpatrick, Cella, Harper & Scinto

[57] ABSTRACT

An ink jet recording apparatus has recording means for discharging ink in response to a recording signal, cap means for covering the ink discharging portion of the recording means, attracting means for attracting the recording means covered by the cap means, and means for inhibiting the cap means from being released from a condition in which it covers the recording means, for a predetermined time after the attracting means has been operated.

13 Claims, 16 Drawing Figures

INK JET RECORDING APPARATUS

BACKGROUND OF THE INVENTION

1. Field of the Invention

This invention relates to an ink jet recording apparatus provided with cap means for covering the fore end of a recording head for discharging ink or suction recovering means for effecting suction recovery of the recording head.

2. Description of the Prior Art

An ink jet printer provided with suction recovering means and a recording head is shown in FIG. 1 of the accompanying drawings.

In FIG. 1, reference numerals 1 and 2 designate main tanks in which ink bags 3 are contained, respectively.

The ink bags 3 in the main tanks 1 and 2 are connected through supply tubes 4 to a sub-tank 5 mounted on a carriage.

A thin supply tube 6 is contained in the subtank 5 which is a recording head and one end thereof is connected to a nozzle 7. The other end of the supply tube 6 is immersed in the ink 8 within the sub-tank 5.

Reference numeral 9 denotes a pump which is suction means. This pump 9 is provided with a piston 10 to which an operating lever 11 is connected.

The pump 9 and the sub-tank 5 are connected together by suction tubes 12, and the pump 9 and a cap 13 for sucking ink are connected together through nozzle tubes 14.

Although not shown, the nozzle 7 is provided with a cylindrical piezo element (a piezo-electric element), and a voltage is applied to this piezo element in accordance with a printing command to compress a glass tube constituting the nozzle, thereby causing ink to be discharged and effecting printing.

Designated by 15 is a return tube which performs the function of returning the drain ink from the pump 9 to a return ink chamber 16 on the main tank 1 side.

Now, describing the positional relation between the suction tubes 12 and the nozzle tubes 14, the suction tubes 12 lie at a higher position and the nozzle tubes 14 lie at a lower position.

Accordingly, when the operating lever 11 is depressed to render the upper side of the piston 10 of the pump 9 into negative pressure, negative pressure is first supplied to the suction tube 12 and at this time, the nozzle tubes 14 are closed.

Thus, at the first stage, the interior of the sub-tank 5 is reduced in pressure and ink is sucked from the main, tanks 1 and 2 into the sub-tank 5.

When the piston 10 is being further depressed, the ink in the nozzle 7 may be sucked through the cap 13.

When ink enters the sub-tank and ink enters the suction tubes 12 by the operation of the pump 9, the resistance on the suction tubes 12 side becomes higher and thereafter, ink is sucked chiefly from the nozzle side.

As a result, bubbles in the nozzle can be eliminated and ink discharge recovery can be accomplished.

On the other hand, when ink is sucked from the suction tubes 12 and the nozzle tubes 14 by the suction of the pump, the interior of the sub-tank 5 is reduced in pressure. Accordingly, if the cap 13 is removed during the time until the interior of the sub-tank restores its original pressure after the suction, the air is sucked in through the nozzle 7 because the internal pressure of the sub-tank 5 has not yet reached its original level, and air is sucked into the nozzle causes non-discharge.

Accordingly, it is necessary to refrain from releasing the cap until this internal pressure is restored to its original level by the supply of ink from the main tank.

If the operator releases the cap neglecting this, an ink non-discharge condition will be caused to occur by the releasing of the cap in spite of the discharge recovering operation having been effected.

SUMMARY OF THE INVENTION

It is an object of the present invention to prevent an inconvenience from occurring due to inadvertent cap releasing operation.

It is another object of the present invention to enable the suction recovering operation of the recording head by suction means to be appropriately effected.

It is still another object of the present invention to prevent the cap from being inadvertently released.

It is yet still another object of the present invention to accomplish the suction recovery of the nozzle more reliably.

It is a further object of the present invention to enable recording to be effected reliably after the cap has been released.

The invention will become fully apparent from the following detailed description thereof taken in conjunction with the accompanying drawings.

DESCRIPTION OF THE PREFERRED EMBODIMENTS

Figure 1:
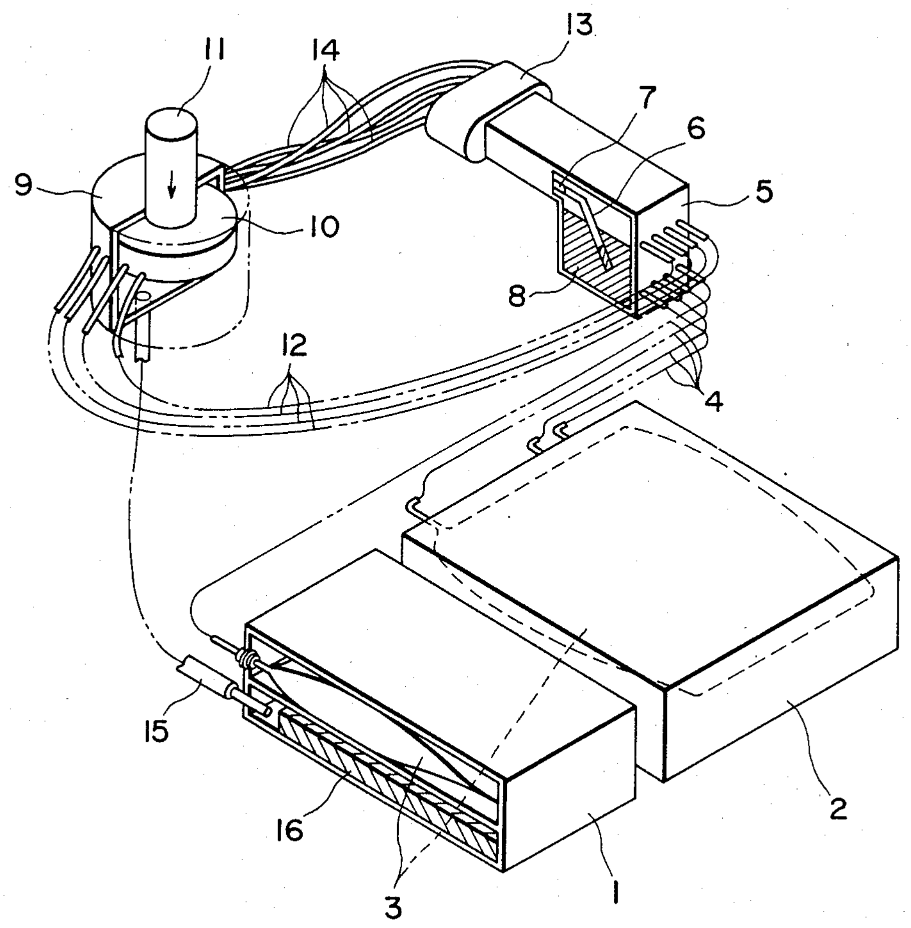
FIG. 1 PRIOR ART
FIG. 1 is a perspective view illustrating the structure according to the prior art.

In FIGS. 2 to 8 which illustrate an embodiment of the present invention, portions identical or corresponding to those of FIG. 1 are given similar reference numerals and need not be described.

Figure 2:
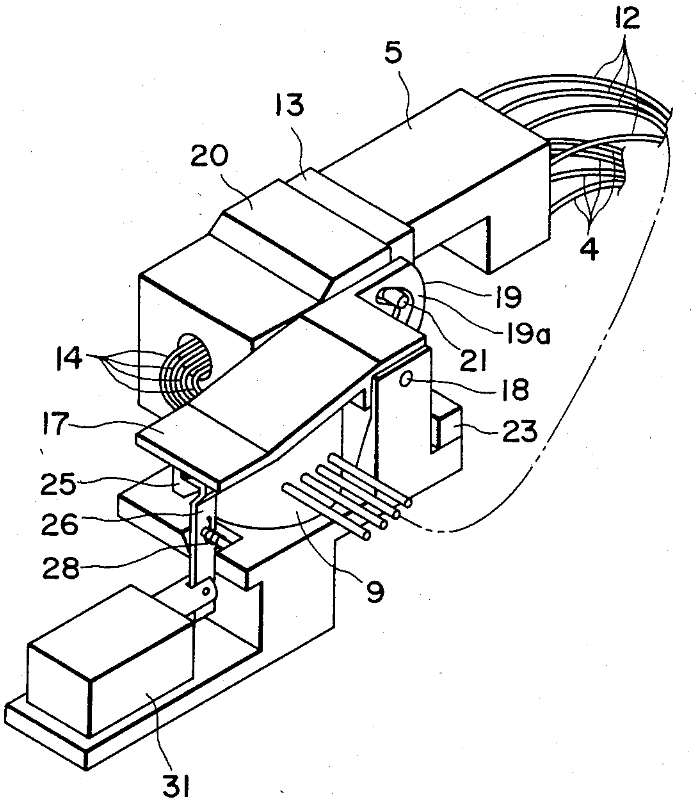
FIGS. 2 to 8 illustrate an embodiment of the present invention, FIG. 2 being a perspective view of the entire embodiment, FIGS. 3A–3C being illustrations showing the structure and operation of a pivotable lever, FIG. 4 being an illustration showing the structure of a cap portion, FIGS. 5A–5D being illustrations showing the structure and operation of a locking mechanism, FIG. 6 being a front view of a locking lever, FIG. 7 being a bottom plan view showing the condition in which the locking lever is mounted, and FIG. 8 being a block diagram of a control circuit.

FIG. 2 shows the relation between a sub-tank 5 which is a recording head and a suction recovering mechanism. Designated by 17 in FIG. 2 is a pivotable lever having one end thereof pivotably supported on the fixed portion of a printer body through a shaft 18.

A projected piece 19 is provided on one end of, the pivotable lever 17 and a dog-legged guide hole **19*a*** is formed in this portion.

The pin 21 of a cap 13 protruding through a guide hole **20*a* formed in a side of a cap holder 20 as shown in FIG. 3 is slidably fitted in the guide hole 19*a***.

A projection **17*a* is provided on the back of the pivotable lever 17 at a position corresponding to the operating lever 11 of a pump 9. A pin 17***b* is provided on a side of the pivotable lever 17, and this pin 17*b* is restrained by a hook 22 provided on the fixed portion.

Designated by 23 is a switch for detecting the operation of the pivotable lever 17. This switch 23 may be closed and opened by a projected piece 17*c* projected from the pivotable lever 17. This switch 23, as will later be described, serves to detect the operation of the pump 9 which is suction means, or in other words, detect whether the cap may be released from its capping state. Also, the timing thereof detects the time when the pump 9 has completed its sucking operation.

Figure 4:
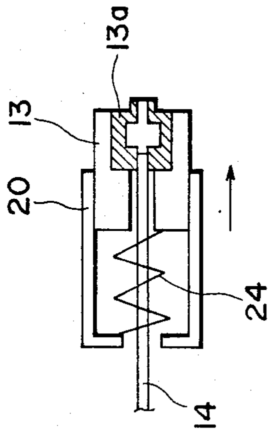

Now, the cap 13, as enlargedly shown in FIG. 4, has cap rubber 13*a* at the fore end thereof and has imparted thereto a force in a direction projecting from the cap holder 20 by a spring 24 resiliently disposed in the cap holder 20.

On the other hand, a hook 25 is projectedly provided on the lower end of the pivotable lever 17 as shown in FIG. 5, and a locking lever 26 is disposed in opposed relationship with the hook 25. The hook 25 and the locking lever 26 are engaged with each other and together constitute holding means for holding the cap 13 in a position in which the nozzle of the sub-tank is sealed.

The locking lever 26 is designed so as to be pivotable about a horizontal shaft 27 fixed to the printer body and to be inclinable axially of the shaft 27, and that side of the locking lever 26 which is opposed to the hook 25 is formed into the shape of a piece formed with two sloped surfaces 26*a* and 26*b*.

Figures 5A, 5B, 5C, 5D:
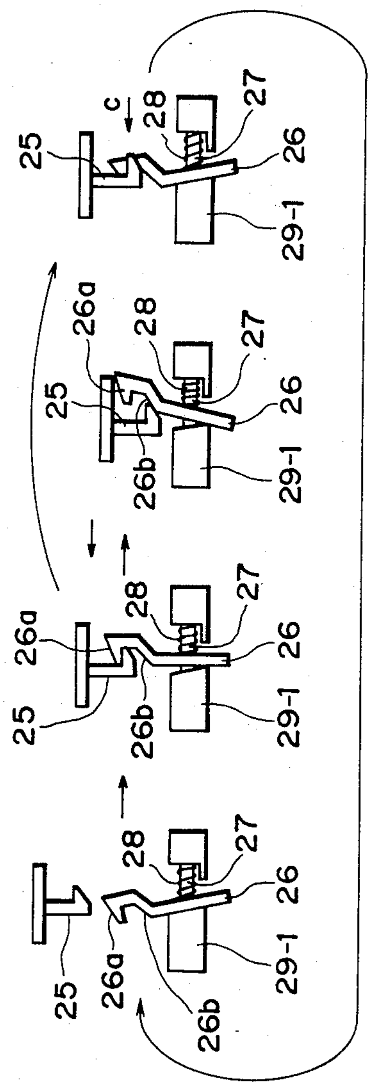
Figure 6:
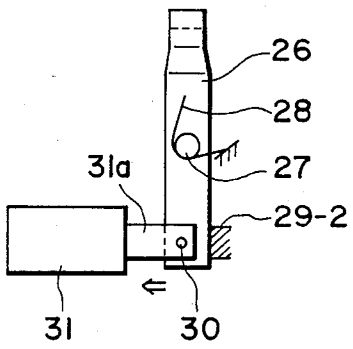

Further, the locking lever 26 is biased counter-clockwise as viewed in FIGS. 5 and 6 by a torsion coil spring 28 wound around the shaft 27 and the pivotal movement thereof has its limit controlled by stoppers 29-1 and 29-2.

Figure 7:
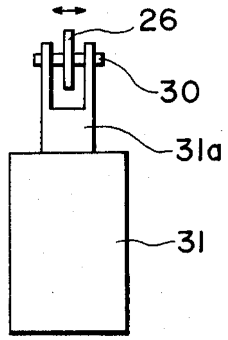

The lower end of the locking lever 26 is pivotably supported on the rod 31*a* of a solenoid 31 through a shaft 30, and is given a clearance so as to be freely movable axially of the shaft 30, as shown in FIG. 7. This solenoid 31 may release the engagement between the hook 25 and the locking lever 26 by being supplied with power, and enables the cap 13 to be released from its capping state.

Description will now be made of operation of the present embodiment constructed as described above.

Figure 3A:
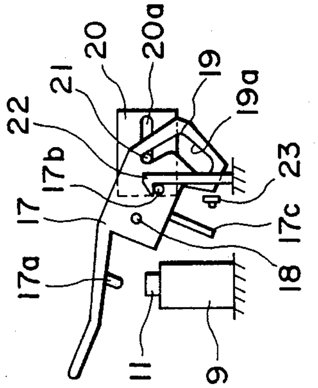

Before the suction recovering operation of the non-discharge of ink is started, the pivotable lever 17 is pivoted clockwise as shown in FIG. 3A, and the pin 17*b* is restrained by the hook 22, and the projection 17*a* is locked in its state spaced apart from the operating lever 11 of the pump 9.

The pivotable lever 17 is biased clockwise about the shaft 18 as viewed in the Figure by the force of a spring or the like, not shown.

In this state, the pin 21 integral with the cap 13 is positioned at the upper end portion of the dog-legged guide hole 19*a* and the cap 13 is drawn into the cap holder 20.

The hook 25 is at a position spaced apart from the locking lever 26 as shown in FIG. 5A, and the locking lever 26 is inclined leftwardly as viewed in FIG. 5A by the pressure force of the torsion coil spring 28.

Figure 3B:
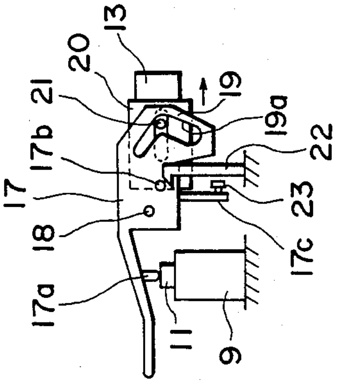

When it is desired to effect the recovering operation of the non-discharge of ink from this state, the pivotable lever 17 is first forced to pivot counterclockwise as shown in FIG. 3B to release the engagement between the hook 22 and the pin 17*b*.

By this operation, the pin 21 integral with the cap 13 is moved along the dog-legged guide hole 19*a* and comes to its bent portion.

As a result, the pin 21 is given the freedom of moving rightwardly in the slot 20*a* as viewed in FIG. 3B, and the cap 13 is pushed by the force of the spring 24 and juts out to completely cap the end of the nozzle 7.

In accordance with this pivotal movement of the pivotable lever 17, the hook 25 lowers as shown in FIG. 5B and further lowers along the sloped surface 26*a* of the upper end of the locking lever 26 and presses the locking lever 26 from its inclined position to its upright position against the pressure force of the torsion coil spring 28.

Soon the pivotable lever 17 rides across the sloped surface 26*a* and is hooked by the piece-like hook portion and locked so that it can no longer return to its original position.

Figure 3C:
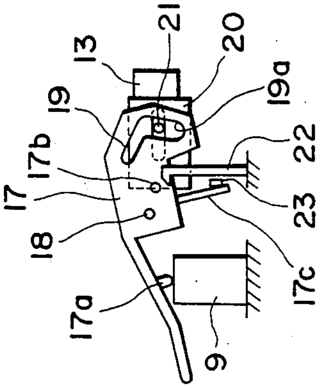

On the other hand, when the pivotable lever 17 is further pivoted counter-clockwise from this state as shown in FIG. 3C, the projection 17*a* presses the operating lever 11 of the pump 9 and therefore, the pump 9 is operated and the recovering operation of the non-discharge of ink and the suction of air in the sub-ink tank are effected.

At this time, as shown in FIG. 3C, the projection 17*c* protruding from the lower end of the pivotable lever 17 presses the switch 23, which is thus closed.

This suction recovering operation involves counter-clockwise rotation of the pivotal lever 17 and therefore, as shown in FIG. 5C, the hook 25 further lowers and comes into engagement with the lower sloped surface 26*b* of the locking lever 26, and pivots the locking lever 26 rightwardly as viewed in FIG. 5C against the pressure force of the torsion coil spring 28.

When the suction recovering operation is terminated and the user releases the pivotable lever 17, the operating lever 11 is pushed up by a spring, not shown, which is contained in the pump 9 and therefore, the pivotable lever 17 tries to return to its original position, but since the hook 25 is restrained by the lower side of the sloped surface 26*a* of the upper end of the piece-like locking lever 26 and kept in its locked condition, the pivotable lever 17 is held in its position of FIG. 3B. Accordingly, the cap 13 does not come off the nozzle 7.

Now, in the course of the operation of returning from the position of FIG. 3C to the position of FIG. 3B, the switch 23 is disengaged from the projection 17*c* and thus is opened. After the falling of this switch has been held for a predetermined time by the timer of a control circuit to be described until the termination of the pumping is confirmed, power is supplied to the solenoid 31. When the rod 31*a* is operated in a direction to be withdrawn as indicated by arrow in FIG. 6, the locking lever 26 pivots clockwise about the shaft 27 as viewed in FIG. 6.

As a result, as shown in FIG. 5D, the locking lever 26 becomes deviated laterally of the hook and therefore, the locking of the hook 25 by the locking lever 26 is released.

The pivotable lever 17 keeps this state with the aid of the force of the torsion coil spring 28 even after the supply of power to the solenoid 31 has been terminated, but if the pivotable lever 17 is raised by the user, the locking lever 26 will be returned to its original position by the force of the torsion coil spring 28 as shown in FIG. 5A and the pivotable lever 17 also will return to its initial position shown in FIG. 3A.

The cap can be completely locked so as not to be released during the time that the sucking operation is effected in this manner, and the cap release in the course of suction by a user's inadvertent operation does not take place and therefore, an ink non-discharge condition during the ink non-discharge recovering operation does not occur.

Figure 8:
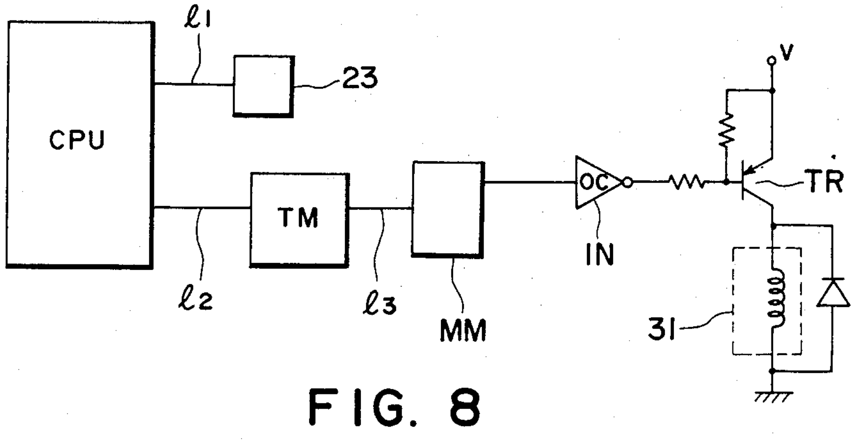

The control of the operation of the above-described pivotable lever is accomplished by a control circuit shown in FIG. 8.

That is, the pivotable lever 17 is pushed to close the switch 23 and thereafter, when the pivotable lever 17 returns to the capping position and the switch 23 is opened, CPU (central processing unit) detects this opening of the switch 23 through a signal line $l_1$. Then, CPU operates a timer TM through a signal line $l_2$.

The time required for the empirically found pressure in the sub-tank 5 to restore its original atmospheric pressure is set in the timer TM.

This timer TM, which is disposed between the switch 23 and the solenoid 31, delays the supply of power to the solenoid 31 and inhibits the release of the capping condition of the cap 13 until the pump 9 completes its sucking operation. Also, in another embodiment which will later be described, the timer has the function of delaying the test discharge of ink.

When a predetermined time elapses after the timer TM has operated, a pulse is put out to a signal line $l_3$ and a monostable multivibrator MM operates and puts out a signal for a predetermined time and renders a transistor TR conductive through an inverter IN to thereby supply a current to the solenoid 31 and releases the locking condition by the locking lever 26 as previously described.

According to the present invention, as described above, the release of the cap is inhibited for a predetermined time after the pumping of the pump and thus, the reliability of the suction recovering operation of the nozzle can be enhanced and good recording (printing) can be obtained.

Figure 9:
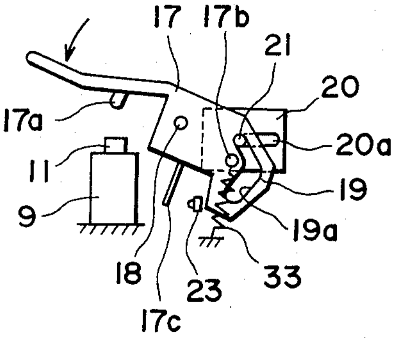
FIGS. 9 to 11 show another embodiment of the present invention, FIG. 9 being a side view of a pivotable lever, FIG. 10 being a block diagram of a control circuit, and FIG. 11 being a plan view of a carriage mechanism.

FIG. 9 and so on show another embodiment of the present invention which is designed such that test discharge is effected after the release of the cap. In FIG. 9 and so on, portions similar to those shown in FIGS. 1-8 are given similar reference numerals and need not be described. In the present embodiment, a spring 33 for biasing the pivotable lever 17 clockwise as viewed in FIG. 9 is provided between the pin 17*b* and the fixed portion of the apparatus body so that when the solenoid 31 is energized to release the engagement between the hook 25 and the locking lever 26, the capping condition of the cap 13 is also released by said release, and in the other points, the construction of the present embodiment is the same as that of the previous embodiment. Accordingly, when the supply of power to the solenoid 31 is effected with the pivotable lever 17 being depressed and the hook 25 and the locking lever 26 being in engagement with each other, the engagement between the hook 25 and the locking lever 26 is released. When the pivotable lever 17 is released from the locking by the locking lever 26, it is automatically returned to the position of FIG. 9, namely, the released condition of capping, by the biasing force of the spring 22. The locking lever 26 also is returned to the position of FIG. 5A by the force of the torsion coil spring 28. Also, thereafter, the nozzle 7 effects test injection by a control circuit to be described and stands by in the recording condition.

The cap can be completely locked so as not to be released during the time that the sucking operation is effected in this manner, and the cap release in the course of suction by the user's inadvertent operation does not take place and therefore, an ink non-discharge condition during the ink non-discharge recovering operation does not occur.

When the sucking operation is completely terminated after a predetermined time and the developed negative pressure sufficiently approximates atmospheric pressure, the cap 13 is automatically released and the nozzle 7 effects test injection and therefore, the recovered condition of the nozzle can be checked and a more reliable suction recovering operation of the nozzle can be effected.

Figure 10:
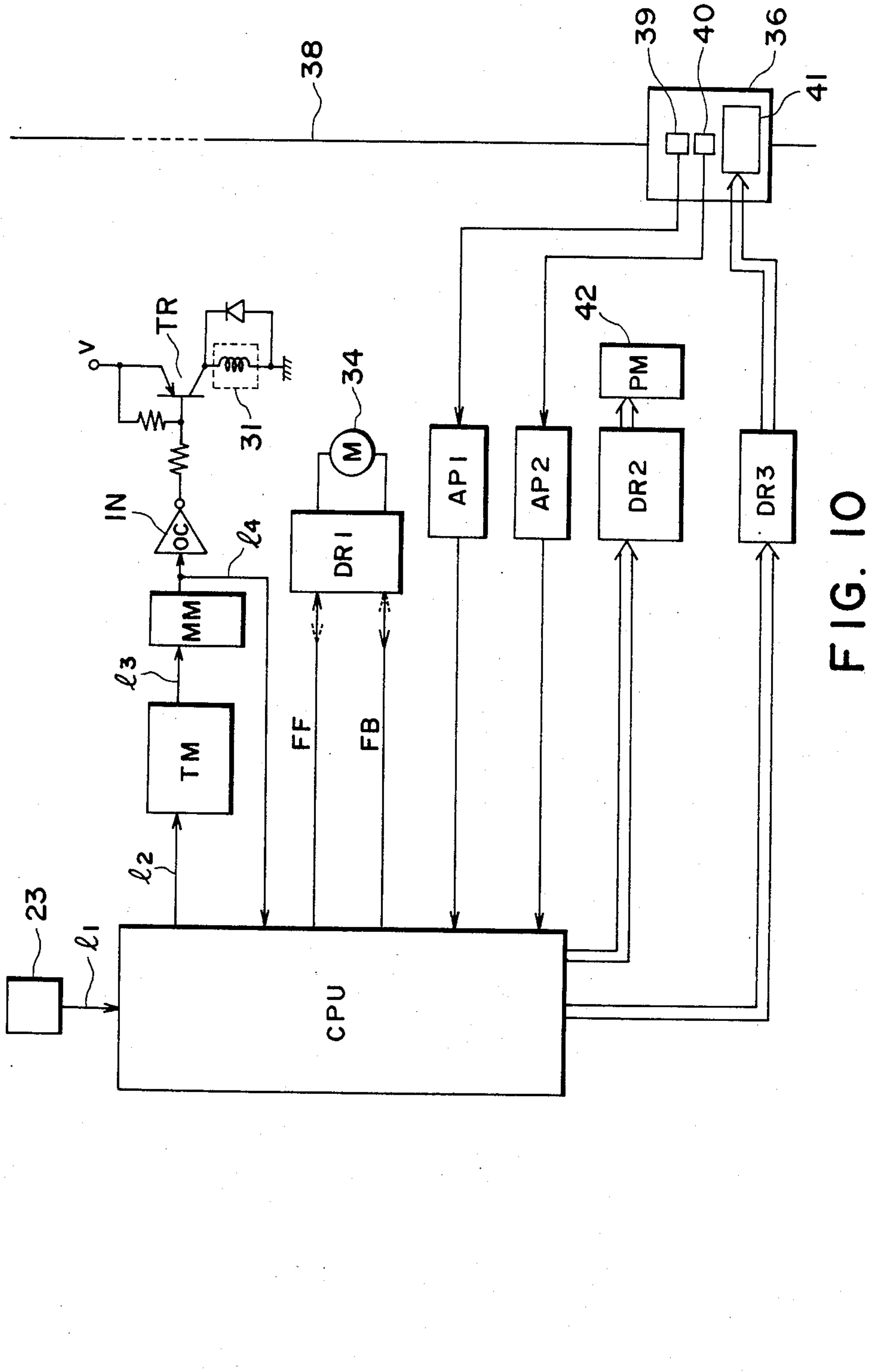

Now, the above-described control of the operation of the pivotable lever and the test injection of the nozzle are accomplished by a control circuit shown in FIG. 10.

That is, the pivotable lever 17 is pushed to close the switch 23 and thereafter, when the pivotable lever 17 returns to the capping position and the switch 23 is opened, CPU (central processing unit) detects this opening of the switch 23 through a signal line $l_1$. Then, CPU operates a timer TM through a signal line $l_2$.

The time required for the empirically found pressure in the sub-tank 5 to restore its original atmospheric pressure is set in the timer TM.

When a predetermined time elapses after the timer TM has operated, a pulse is put out to a signal line $l_3$ and a monostable multivibrator MM operates and puts out a signal for a predetermined time and renders a transistor TR conductive through an inverter IN to thereby supply a current to the solenoid 31 and releases the locking condition by the locking lever 26 as previously described. Thereby the pivotable lever 17 is automatically returned to its original position and releases the cap 13 from the recording head.

Figure 11:
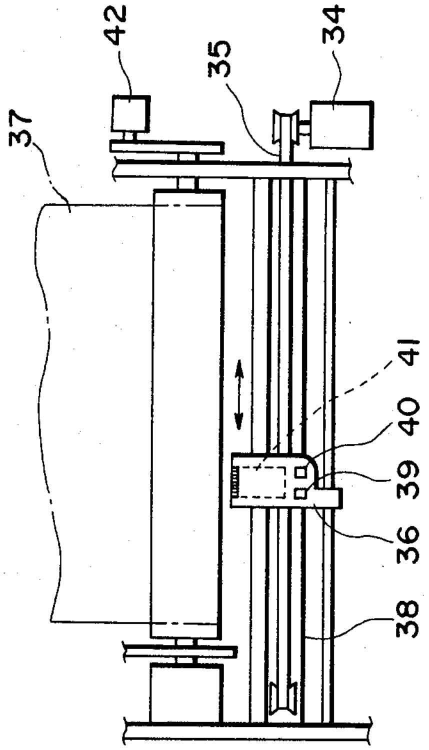

Thereafter, CPU detects the termination of the attraction of the solenoid 31 by a signal line $l_4$, and drives a motor 34 by signal lines FF and FB through a driver DR1 to move a carriage 36 in the direction of arrow relative to recording paper 37 by the belt 35 of FIG. 11. At this time, the signal from a slit plate 38 is detected through sensors 39 and 40 (each of which comprises a combination of a light-emitting diode and a phototransistor) and amplifiers AP1 and AP2, whereby the speed of the carriage 36 is controlled and a driver DR3 is driven at a predetermined position to operate the piezo 41 of the nozzle 7 and cause ink to be test-injected. Assuming that four-color printing is to be executed by four nozzles, the piezos of the respective colors are driven at a predetermined position and respective inks are discharged to execute the printing.

The direction of movement of the carriage 36 is lateral, but a pulse motor 42 is operated by the drive of a driver DR2 to execute paper feeding, whereby longitudinal movement is effected to complete the printing.

In this manner, the capping of the nozzles is released by the attraction of the solenoid 31 and thereafter, as described above, in the case of multicolor printing, for example, respective ink colors are printed, whereby the ink suction recovery is effected normally and whether the ink discharge from each nozzle has been effected normally can be checked.

It is preferable that the test injection of the present invention be effected to the non-printing column.

According to the present embodiment, as described above, the release of the cap is inhibited for a predetermined time after the pumping of the pump and, after a predetermined time has elapsed, the cap is automatically released to effect test injection and therefore, the reliability of the suction recovering operation of the nozzles is enhanced and good recording (printing) can be obtained, and it is easy to understand that a predetermined time has elapsed.

What we claim is:

1. An ink jet recording apparatus comprising:
- recording means for discharging ink in response to a recording signal;
- cap means for covering the ink discharging portion of said recording means;
- attracting means for attracting said recording means covered by said cap means; and
- means for inhibiting said cap means from being released from a condition in which it covers said recording means, for a predetermined time after said attracting means has been operated.

2. An ink jet recording apparatus according to claim 1, wherein said inhibiting means includes holding means for holding said cap means in a position in which it covers the ink discharging portion of said recording means, time counting means for counting a predetermined time after said attracting means has been operated, and releasing means for enabling the holding of said holding means to be released after said time counting means has counted said predetermined time.

3. An ink jet recording apparatus according to claim 1 or 2, further comprising detecting means for detecting that said attracting means has completed its operation and wherein as a result of said detection, the inhibition of release by said inhibiting means is cancelled.

4. An ink jet recording apparatus comprising:
- recording means for discharging ink in response to a recording signal;
- cap means for covering the ink discharging portion of said recording means;
- holding means for holding said cap means in a condition in which it covers said recording means;
- detecting means for detecting whether said cap means may be released from the condition in which it covers said recording means; and
- releasing means for enabling the capping condition of said cap means to be released when it has been detected by said detecting means that said cap means may be released.

5. An ink jet recording apparatus according to claim 4, further comprising attracting means for attracting said recording means covered by said cap means.

6. An ink jet recording apparatus according to claim 5, wherein said detecting means detects that said attracting means has completed its attracting operation.

7. An ink jet recording apparatus comprising:
- recording means for discharging ink in response to a recording signal;
- cap means for covering the ink discharging portion of said recording means;
- attracting means for attracting said recording means covered by said cap means;
- detecting means for detecting that said attracting means has been operated; and
- control means for causing said recording means to effect test discharge when said detecting means has detected the operation of said attracting means.

8. An ink jet recording apparatus according to claim 7, further comprising releasing means for releasing the covering condition of said cap means before the test discharge of said recording means when said detecting means has detected the operation of said attracting means.

9. An ink jet recording apparatus according to claim 7, wherein delay means is provided between said detecting means and said control means.

10. An ink jet recording apparatus according to claim 8, wherein delay means is provided between said detecting means and said releasing means.

11. An ink jet recording apparatus comprising:
- recording means for discharging ink in response to a recording signal;
- cap means for covering the ink discharging portion of said recording means;
- dêtecting means for detecting whether said cap means may be released from a condition in which it covers said recording means; and
- control means for causing said recording means to effect test discharge when it has been detected by said detecting means that said cap means may be released.

12. An ink jet recording apparatus according to claim 11, further comprising attracting means for attracting said recording means covered by said cap means.

13. An ink jet recording apparatus according to claim 11 or 12, further comprising releasing means for releasing the covering condition of said cap means before the test discharge of said recording means when it has been detected by said detecting means that said cap means may be released.

* * * * *

UNITED STATES PATENT AND TRADEMARK OFFICE

CERTIFICATE OF CORRECTION

PATENT NO. : 4,551,735

DATED : November 5, 1985

INVENTOR(S) : TETSUO SUZUKI, ET AL.

It is certified that error appears in the above-identified patent and that said Letters Patent is hereby corrected as shown below:

Column 1, line 54, delete "being".

Column 2, line 2, delete "is".

Signed and Sealed this

*Twenty-sixth* Day of *August 1986*

[SEAL]

*Attest:*

DONALD J. QUIGG

*Attesting Officer* *Commissioner of Patents and Trademarks*